(12) United States Patent
Huovinen et al.

(10) Patent No.: US 6,503,993 B1
(45) Date of Patent: Jan. 7, 2003

(54) PROPYLENE POLYMERS AND PRODUCTS THEREOF

(75) Inventors: Päivi Huovinen, Ferrara (IT); Pirjo Jääskeläinen, Porvoo (FI); Amir Karbasi, Espoo (FI); Christer Lind, Stenungsund (SE); Bo Malm, Espoo (FI); John Haugen, Stathelle (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 09/530,294

(22) PCT Filed: Nov. 9, 1998

(86) PCT No.: PCT/FI98/00867
§ 371 (c)(1),
(2), (4) Date: Jun. 27, 2000

(87) PCT Pub. No.: WO99/24479
PCT Pub. Date: May 20, 1999

(30) Foreign Application Priority Data

Nov. 7, 1997 (FI) .................................. 974176
Feb. 13, 1998 (FI) ................................ 980342

(51) Int. Cl.$^7$ .............. C08F 10/06; C08F 110/06; C08F 297/08

(52) U.S. Cl. ................ 526/348.1; 526/124.6; 526/125.3; 526/128; 502/127; 525/247

(58) Field of Search ............ 526/348.1, 124.6, 526/125.3, 128; 502/127; 525/247

(56) References Cited

U.S. PATENT DOCUMENTS

| | | | |
|---|---|---|---|
| 5,159,021 A | * | 10/1992 | Kioka et al. ............. 525/247 |
| 5,234,879 A | | 8/1993 | Garoff et al. |
| 5,710,229 A | * | 1/1998 | Garoff et al. ............. 526/348 |

FOREIGN PATENT DOCUMENTS

| | | |
|---|---|---|
| EP | 0151883 | 8/1985 |
| EP | 0152701 | 8/1985 |
| EP | A2321218 | 6/1989 |
| EP | 0368577 | 5/1990 |
| EP | A2369658 | 5/1990 |
| EP | 0417319 | 3/1991 |
| EP | 0586109 | 3/1994 |
| EP | A2586109 | 3/1994 |
| EP | 0607703 | 7/1994 |
| EP | 0627449 | 12/1994 |
| WO | WO9219653 | 11/1992 |
| WO | WO9219658 | 11/1992 |
| WO | WO9426794 | 11/1994 |
| WO | WO9512622 | 5/1995 |
| WO | WO9812234 | 3/1998 |

OTHER PUBLICATIONS

Encyclopedia of Polymer Science and Engineering, 2nd ed., vol. 6, 1986, pp. 544–559.
Polymeric Materials Encyclopedia, edited by J.C. Salamone, vol. 9, 1996 pp. 6602–6608, Propylene (Nucleating Agents), by K. Mitsuishi.

* cited by examiner

Primary Examiner—James J. Seidleck
Assistant Examiner—Olga Asinovsky
(74) Attorney, Agent, or Firm—Birch, Stewart, Kolasch & Birch, LLP (57) ABSTRACT

The present invention concerns nucleated propylene polymers having a xylene soluble fraction at 23° C. of less than 2.5%, a crystallization temperature of over 124 ° C. and a tensile modulus of greater than 2,000 MPa. These polymers can be prepared by nucleating a propylene polymer with a polymeric nucleating agent containing vinyl compound units, and by polymerizing propylene optionally with comonomers in the presence of a Ziegler-Natta catalyst system primarily transesterified with a phthalic acid ester—a lower alcohol pair to provide said propylene polymer. The catalyst contains a strongly coordinating external donor.

51 Claims, 1 Drawing Sheet

PROPYLENE POLYMERS AND PRODUCTS THEREOF

This application is the national phase under 35 U.S.C. §371 of PCT International Application No. PCT/FI98/00 867 which has an International filing date of Nov. 9, 1998, which designated the United States of America.

BACKGROUND OF THE INVENTION

1. Field of the Invention

The present invention relates to propylene polymers. In particular, the present invention concerns efficiently nucleated propylene homo- and copolymers. The invention further concerns a process for preparing such compositions. Finally, the present invention relates to the use of the new propylene polymers for the manufacture of products by, e.g., extrusion, blow moulding, thermoforming and injection moulding. Examples of such articles are tubes, pipes and fittings, housings of various appliances and cups and pails.

2. Description of Related Art

Propylene (PP) homo- and copolymers have excellent resistance to heat and chemicals as well as attractive mechanical properties. These characteristics make propylene polymers more suitable than polyethylene for some uses, for example in pipes, fittings and other similar articles formed by extrusion or moulding. However, processing of polypropylene by, e.g., injection moulding, thermoforming or blow moulding, to form thin-walled containers has resulted in products having insufficient stiffness, transparency and cycle time. This is caused by the semi-crystalline nature of polypropylene. Injection moulding processing has also resulted in products having insufficient stiffness and cycle time.

In the prior art it has been proposed to improve the transparency of moulded polypropylene by blending the polymer with various nucleating agents such as dibenzilidene sorbitol (DBS), sodium benzoate or di(alkylbenzilidene)sorbitol. These traditional nucleating agents tend to bleed out from the polymer composition during processing and many of them give rise to fumes with an offensive smell. As a solution to these problems, it has been suggested in the art to use vinyl compounds, such as polymers of vinyl cycloalkanes and 3-methyl-1-butene, as nucleating agents in the form of propylene copolymers or polypropylene compounds, cf. EP Patent Specifications Nos. 0 151 883, 0 152 701, 0 206 515, 0 368 577 0 369 658 and 0 417 319. However, the known polymerically nucleated polypropylenes still have somewhat low isotacticity and the yield and productivity of the known polymerization processes are not satisfactory. Further, there is no suggestion in the afore-mentioned EP Patents that these polymers would be suitable for manufacture of pipes and fittings.

SUMMARY OF THE INVENTION

It is an object of the present invention to eliminate the problems related to the prior art and to provide a novel high crystallinity propylene polymer having high isotacticity and excellent mechanical properties.

A second object of the invention is to provide a novel process with high productivity for preparing novel propylene polymer compositions of the above kind.

It is still a further object of the present invention to provide extruded and moulded products comprising high crystallinity propylene polymer compositions.

These and other objects, together with the advantages thereof over known processes and products, which shall become apparent from the specification which follows, are accomplished by the invention as hereinafter described and claimed.

The invention is based on the idea of providing a propylene polymer which is nucleated with 0.0001 to 1% by weight of a polymerized vinyl compound and containing less than 0.01 wt-ppm (or below the limit of detection of the Gas Chromatography-Mass Spectrometry, GC-MS, method) of unreacted monomeric vinyl compounds. Polymerization of propylene optionally with comonomers in the presence of a transesterified Ziegler-Natta catalyst system comprising a strongly coordinating external donor will yield a nucleated polymer of the above kind having improved isotacticity. Thus, homopolymers prepared with a ZN catalyst system modified with a polymerized vinyl compound will have a content of less than 2.5%, in particular less than 2% xylene solubles at 23° C., a crystallization temperature of over 124° C., in particular 126° C. or higher, and a tensile modulus of greater than 2,000 MPa, preferably greater than 2,100 MPa (or even greater than 2,200 MPa). By using a modified catalyst composition containing practically no or only minute amounts (preferably less than 2000 ppm, in particular less than 1000 ppm of monomer residues ) for the manufacture of the propylene polymer, no separate washing steps are needed and high catalyst activity can be maintained.

Finally, it has now been observed that high polymerization temperature increases isotacticity. Thus, the amount of xylene solubles decreases with 20 to 25% or more when the polymerization temperature is increased from 70° C. to 90° C.

The efficiently nucleated propylene polymers are particularly suitable for use tubes, pipes and fittings, as well as in buffer tubes of optical cables.

More specifically, the polymer according to the present invention is characterized by what is stated in the characterizing part of claim 1.

The process according to the present invention for preparing nucleated polypropylene compositions is characterized by what is stated in the characterizing part of claim 6.

The present polymer articles are characterized by what is stated in the characterizing parts of claims 34 and 42.

The invention achieves a number of considerable advantages, some of which were already discussed above. In particular it can be noted that the present high-crystallinity propylene polymers are characterized by high crystallinity and high crystallization temperature. In comparison to conventional polypropylene the present polymers exhibit good mechanical properties, such as high modulus, high heat resistance and water vapour barrier. Very good and consistant nucleation improves clarity in a better way than with conventional nucleating agents. Nucleation dominates effect from different pigments; this means consistent shrinkage and warpage in multicoloured parts. The crystallinity is influenced by the high isotacticity (preferably>98%) of the polymer and by the effective nucleation with the polymerised vinyl compounds.

With the aid of high polymerization temperatures, the activity of the catalyst is increased by about 80%. Thus, to mention an example, by using a transesterified $MgCl_2$ supported $TiCl_4$ catalyst prepared according to FI 88047 and dicyclopentyl dimethdxy silane (also known as donor D) as an external electron donor (in the following this catalyst is also abbreviated BC-1/D), after a one hour polymerization, the activity of the catalyst presently used at a polymerization temperature of 90° C. was about 80 kg/g cat, whereas at 70° C. the activity of the same catalyst was less than 45 kg/g cat.

The present compositions can be used in any kind of polymer articles. Particular advantages are obtained by applying the compositions to the manufacture of appliances, automotive parts, cups, pails, containers, caps or closures. The new material can also be used in various cable, tube and pipe applications. These are, for example, fiber optic buffer tubes, smooth solid wall pipes, fittings, and pipe system details, e.g. valves, chambers and manholes, for indoor or buried sewage, multilayer pipes and fittings for indoor or buried sewages, and structured wall pipes and fittings for buried sewage.

The material used according to the present invention will in a cost effective way give pipes with clearly higher stiffness than standard heterophasic copolymers, measured on plaques of the material itself or on pipes, and improved or retained impact properties. The combination of high HDT and high. stiffness means that it is possible to reduce wall thickness and by this optimize cycle time. Compared to mineral filled PP, the present products provide low cost due to reduced volume price (lower density). Better scratch resistance and high gloss is also obtained. The stiffness of polypropylene pipes is increased not only in radial direction but also in axial direction. Furthermore, the pressure resistance (Slow Crack Growth Properties) is improved compared to standard polypropylene which leads to better long term properties.

Not only do the present propylene polymers render the products excellent mechanical properties, some of which are discussed above, but preliminary trials indicate that they also improve pipe extrusion by yielding higher output and better pipe surfaces than conventional polypropylene having a similar molar mass distribution (MWD) of homopolymer phase and rubber phase. In connection with injection moulding, faster cycle times for fittings can be obtained.

A further important advantage of the invention resides in the fact that the present polymers will achieve low-cost formulations, which makes it possible to reach about the same final cost per length of pipe as with PVC. In particular, by adding small amounts of talc the stiffness of the polypropylene compositions can be further improved which reduces PP raw material costs of the final products.

Next, the invention will be more closely examined with the aid of the following detailed description.

DETAILED DESCRIPTION OF THE INVENTION

Definitions

"Strongly coordinating donor" designates donors which form relatively strong complexes with catalyst surfaces, mainly with a $MgCl_2$ surface in the presence of aluminium alkyl and $TiCl_4$. The donor components are characterized by strong complexation affinity towards catalyst surfaces and a sterically large and protective hydrocarbon (R'). Strong coordination with $MgCl_2$ requires oxygen-oxygen distance of 2.5 to 2.9 Å [Albizzati et al., Macromol. Symp. 89 (1995) 73–89].

By "Melt Flow Rate" or abbreviated "MFR" is meant the weight of a polymer extruded through a standard cylindrical die at a standard temperature in a laboratory rheometer carrying a standard piston and load. MFR is a measure of the melt viscosity of a polymer and hence also of its molar mass. The abbreviation "MFR" is generally provided with a numerical subindex indicating the load of the piston in the test. Thus, e.g., $MFR_2$ designates a 2.16 kg load and $MFR_{10}$ a load of 10.0 kg. MFR can be determined using, e.g., by one of the following tests: ISO 1133 C4, ASTM D 1238 and DIN 53735.

For the purpose of the present invention, "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt-% monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

"High temperature polymerization" stands for polymerization temperatures above a limiting temperature of 80° C. which is usually known to be harmful for high yield catalysts of related prior art. At high temperatures the stereospecificity of the catalyst and the morphology of the polymer powder can be lost. This does not take place with the particularly preferred type of catalysts used in the invention which is described below. The high temperature polymerization takes place above the limiting temperature and below the corresponding critical temperature of the reaction medium. Preferably the high temperature polymerization according to the present invention is carried out in a loop reactor.

Nucleation of Propylene Polymers

By nucleating propylene polymers with vinyl compounds it is possible to provide polypropylene having a higher degree of crystallinity, a higher crystallization temperature, smaller crystallization size and: a greater crystallization rate. These kinds of compositions can be used for the preparation of moulded products. They exhibit improved optical and physical properties.

The nucleation of the propylene polymers can be carried out by modification of the polymerization catalyst with polymerised vinyl compounds and using the modified catalyst for polymerization of propylene optionally in the presence of comonomers to provide a propylene polymer or copolymer containing about 0.0001 to 1%, preferably 0.0001 to 0.1% and in particular about 0.001 to 0.01% (calculated from the weight of the composition) polymerized vinyl compounds. Another approach for nucleating propylene polymers comprises blending polypropylene with polymers containing vinyl compound units.

For the purpose of the present invention "vinyl compounds" are compounds having the formula wherein $R_1$ and $R_2$ together form a 5 or 6 membered saturated or unsaturated or aromatic ring or they stand independently for a lower alkyl comprising 1 to 4 carbon atoms.

The following specific examples of vinyl compounds can be mentioned: vinyl cycloalkanes, in particular vinyl cyclohexane (VCH), vinyl cyclopentane, vinyl-2-methyl cyclohexane and vinyl norbornane, 3-methyl-1-butene, styrene, p-methyl-styrene, 3-ethyl-1-hexene or mixtures thereof. VCH is a particularly preferred monomer but, for example 3-methyl-1-butene can be used as a monomer or comonomer to adjust the crystallisation temperature.

For the purpose of the present invention "nucleated propylene homopolymer" stands for a homopolymer (or the homopolymer matrix of a block copolymer) having an increased and controlled degree of crystallinity preferably amounting to over 50% and preferably having a crystallization temperature which is at least 7° C., preferably at least 10° C. and in particular over 13° C. higher than the crystallization temperature of the corresponding non-nucleated polymer. Using high-yield Ziegler-Natta catalysts, the crystallization temperature of a nucleated propylene polymer is higher than 120° C., preferably over 124° C. and in particular over 126° C. In compositions containing colouring pigments having a nucleating effect, particularly advantageous results are obtained by using polymers having a crystallization temperature over 15° C. higher than that of the corresponding non-nucleated polymer (for a polymer produced with the above-mentioned ZN-catalyst, 128° C.).

According to a preferred embodiment of the present invention, modification of the catalyst with the polymerised vinyl compound, such as VCH, is performed in an inert fluid which does not dissolve the polymer formed (e.g. polyVCH). One particularly preferred modification medium comprises a viscous substance, in the following a "wax", such as an oil or a mixture of an oil with a solid or highly viscous substance (oil-grease). The viscosity of such a viscous substance is usually 1,000 to 15,000 cP at room temperature. The advantage of using wax is that the catalyst can be modified, stored and fed into the process in the same media and catalyst wax preparation and modification is performed in the same process device. Due to the fact that no washing, drying, sieving and transferring thus are needed, the catalyst activity is maintained (cf. Finnish Patent No. 95387). The present process is inexpensive because high catalyst concentrations and high PP production capacities can be used. Also the amount of waste is diminished because the modification medium does not have to be removed.

In the catalyst modification, the polymerization of the vinyl compound is continued until the concentration of unreacted vinyl compounds is less than about 0.5 wt-%.

A particularly preferred embodiment of the catalyst modification comprises the following steps:

introducing a catalyst into the reaction medium;

adding a cocatalyst;

feeding a vinyl compound to the agitated reaction medium at a weight ratio of 0.1 to 2, preferably 0.1 to 1.5, vinyl compound/catalyst;

subjecting the vinyl compound to a polymerization reaction in the presence of said catalyst at a temperature of 35 to 65° C.; and continuing the polymerization reaction until a maximum concentration of the unreacted vinyl compound of less than 2000, preferably less than 1000 ppm by weight, is obtained.

According to another preferred embodiment, the method for improving the crystallinity and transparency of polypropylene by blending a crystalline polypropylene with a vinyl cycloalkane polymer is carried out by melt-kneading the crystalline polypropylene with the crystal nucleating agent, compounding the crystal nucleating agent with the crystalline polypropylene and melt kneading the mixture during film formation, and compounding the master batch of the crystal nucleating agent with the crystalline polypropylene.

Another method of making a concentrated modified catalyst is to polymerise propylene with the modified catalyst until a predetermined polypropylene-to-pVCH ratio is reached.

The vinyl compound units of the blending and compounding process can be derived from any of the units identified in the above formula 1 in connection with the first embodiment of the invention.

The modification of the catalyst is carried out essentially before any prepolymerization of the catalyst with an olefinic monomer, such as ethylene or propylene. Prepolymerization here means a conventional, usually continuous process step performed prior to the main polymerization step(s), wherein the catalyst is polymerised with olefin(s) to a minimum degree of 10 g polyolefin per 1 g of catalyst. By carrying out the modification of the catalyst essentially before contacting the catalyst with an olefin, it can be ensured that the polymerization reaction of the vinyl compound is complete under the reaction conditions observed.

Catalyst

As catalyst any stereospecific catalyst for propylene polymerization can be used, which is capable of catalyzing polymerization and copolymerization of propylene and comonomers at a pressure of 5 to 100 bar, in particular 25 to 80 bar, and at a temperature of 40 to 110° C., in particular 60 to 110° C. Preferably the catalyst comprises a high-yield, Ziegler-Natta-type catalyst which can be used at high polymerization temperature of 80° C. or more.

Generally, the Ziegler-Natta catalyst used in the present invention comprises a catalyst component, a cocatalyst component, an external donor, the catalyst component of the catalyst system primarily containing magnesium, titanium, halogen and an internal donor.

The catalyst preferably contains a transition metal compound as a procatalyst component. The transition metal compound is selected from the group of titanium compounds having an oxidation degree of 3 or 4, vanadium compounds, zirconium compounds, chromium compounds, cobalt compounds, nickel compounds, tungsten compounds and rare earth metal compounds, titanium trichloride and titanium tetrachloride being particularly preferred.

Examples of suitable catalyst systems are described in, for example, Finnish Patents Nos. 86866, 96615 and 88047 and 88048.

One particularly preferable catalyst, which can be used in the present invention, is disclosed in FI Patent No. 88047. Another preferred catalyst is disclosed in Finnish Patent Application No. 963707.

A catalyst system useful in the present process can be prepared by reacting a magnesium halide compound with titanium tetrachloride and an internal donor. The magnesium halide compound is, for example, selected from the group of magnesium chloride, a complex of magnesium chloride with a lower alkanol and other derivatives of magnesium chloride. $MgCl_2$ can be used as such or it can be combined with silica, e.g. by absorbing the silica with a solution or slurry containing $MgCl_2$. The lower alkanol used can be preferably methanol or ethanol, particularly ethanol.

The titanium compound used in the preparation of the procatalyst is preferably an organic or inorganic titanium compound, having an oxidation state of titanium of 3 or 4. Also other transition metal. compounds, such as vanadium, zirconium, chromium, molybdenum and tungsten compounds can be mixed with the titanium compound. The titanium compound usually is halide or oxyhalide, an organic metal halide, or a purely metal organic compound, in which only organic ligands have been attached to the transition metal. Particularly preferable are the titanium halides, especially TiCl$_4$. Preferably the titanation is carried out in two or three steps.

The alkoxy group of the phthalic acid ester used comprises at least five carbon atoms, preferably at least 8 carbon atoms. Thus, as the ester can be used for example propyi-hexyl phthalate, dioctyl phthalate, dinonyl phthalate, diiso-decyl phthalate, di-undecyl phthalate, ditridecyl phthalate or ditetradecyl phthalate.

The partial or complete transesterification of the phthalic acid ester can be carried out e.g. by selecting a phthalic acid ester—a lower alcohol pair, which spontaneously or with the aid of a catalyst, which does not damage the procatalyst composition, transesterifies the catalyst at an elevated temperatures. It is preferable to carry out the transesterification at a temperature, which lies in the range of 110 to 150° C., preferably 120 to 140° C. Complete transesterification is advantageous for highly stereospecific catalysts.

The catalyst prepared by the method above is used together with an organometallic cocatalyst and with an external donor. Generally, the external donor has the formula IV $$R_nR'_mSi(R''O)_{4-n-m}$$

wherein

R and R' can be the same or different and they stand for a linear, branched or cyclic aliphatic, or aromatic group;

| | |
|---|---|
| R'' | is methyl or ethyl; |
| n | is an integer 0 to 3; |
| m | is an integer 0 to 3; and |
| n + m | is 1 to 3. |

The aliphatic groups in the meanings of R and R' can be saturated or unsaturated. Linear $C_1$ to $C_{12}$ hydrocarbons include methyl, ethyl, propyl, butyl, octyl and decanyl. As examples of suitable saturated branched $C_{1-8}$ alkyl groups, the following can be mentioned: isopropyl, isobutyl, isopentyl, tert-butyl, tert-amyl and neopentyl. Cyclic aliphatic groups containing 4 to 8 carbon atoms comprise, e.g., cyclopentyl, cyclohexyl, methyl cyclopentyl and cycloheptyl.

According to the present invention, the donors used are preferably strongly coordinating donors which form relatively strong complexes with catalyst surface, mainly with MgCl$_2$ surface in the presence of aluminium alkyl and TiCl$_4$. The donor components are characterised by a strong complexation affinity towards catalyst surface and a sterically large and protective hydrocarbon (R').

Typically this kind of donors has the structure of the general formula II $$R'''_nSi(OMe)_{4-n}$$

wherein R''' is a branched aliphatic or cyclic or aromatic group, and n is 1 or 2, preferably 2. [Härkönen et al., Macromol. Chem. 192 (1991) 2857–2863].

Another group of such donors are 1,3-diethers having the formula III $$R'R''C(COMe)_2$$

wherein R' and R'' are the same or different and stand for a branched aliphatic or cyclic or aromatic group.

In particular, the external donor is selected from the group consisting of dicyclopentyl dimethoxysilane, diisopropyl dimethoxysilane, di-isobutyl dimethoxysilane, and di-t-butyl dimethoxysilane.

An organoaluminum compound is used as a cocatalyst. The organoaluminium compound is preferably selected from the group consisting of trialkylaluminium, dialkyl aluminium chloride and alkyl aluminium sesquichloride.

Polymerization

Following the modification of the catalyst with the vinyl compound of the first preferred embodiment of the invention, the catalyst is optionally prepolymerized with propylene and/or another 1-olefin to provide a prepolymerized catalyst composition which is used for polymerization of propylene optionally together with comonomers.

The propylene homo- or copolymer can have a unimodal or bimodal molar mass distribution. The MWD is advantageously>4, preferably>6. Thus, the equipment of the polymerization process can comprise any polymerization reactors of conventional design for producing propylene homo- or copolymers. The polymerization reactor system can comprise one or more conventional stirred-tank slurry reactors, as described in WO 94/26794, or one or more gas phase reactors. Preferably the reactors used are selected from the group of loop and gas phase reactors and, in particular, the process employs at least one loop reactor and at least one gas phase reactor. This alternative is particularly suitable for producing bimodal polypropylene. By carrying out the polymerization in the different polymerization reactors in the presence of different amounts of hydrogen, the MWD of the product can be broadened and its mechanical properties and processability improved . It is also possible to use several reactors of each type, e.g. one loop reactor and two or three gas phase reactors or two loops and one gas phase reactor, in series.

The particularly preferred embodiment of the invention comprises carrying out the polymerization in a process comprising loop and gas phase reactors in a cascade where the loop reactor operates in liquid propylene and at high polymerization temperatures. The second polymerization step is made in gas phase reactor(s) in order to broaden the molar mass distribution of the polymer.

In every polymerization step it is possible to use also comonomers selected from the group of ethylene, propylene, butene, pentene, hexene and alike as well as their mixtures.

As emphasized above, the polymerization is carried out at high polymerization temperatures. With transesterified high-yield ZN-catalysts, these temperatures will increase the isotacticity of the polymers. At 80 to 90° C., a transesterified catalyst, prepared according to FI 88047, together with a strongly coordinating external donor, dicyclopentyl-dimethoxysilane, give high yield and low xylene solubles values of less than 1.5% compared to 2 to 2.5% at 70° C.

The excellent mechanical properties of the present polymers are evidence by the unique combination of high tensile moduli (E-modulus>2,000 MPa) and impact strength values of about 4 kJ/m$^2$ of propylene homopolymers.

In addition to the actual polymerization reactors used for producing the propylene homo- or copolymer, the polymerization reaction system can also include a number of additional reactors, such as pre- and/or postreactors. The prereactors include any reactor for pre-polymerizing the modified catalyst with propylene and/or other 1-olefin(s), if necessary. The postreactors include reactors used for modifying and improving the properties of the polymer product (cf. below). All reactors of the reactor system are preferably arranged in series.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer on such flowing rate which will make the particles act as a fluid. The fluidizing gas can contain also inert carrier gases, like nitrogen and also hydrogen as a modifier. The fluidized gas phase reactor can be equipped with a mechanical mixer.

The gas phase reactor used can be operated in the temperature range of 50 to 115° C., preferably between 60 and 110° C. and the reaction pressure between 5 and 50 bar and the partial pressure of monomer between 2 and 45 bar.

The pressure of the effluent, i.e. the polymerization product including the gaseous reaction medium, can be released after the gas phase reactor in order optionally to separate part of the gaseous and possible volatile components of the product, e.g. in a flash tank. The overhead stream or part of it is recirculated to the reactor.

The propylene homo- or copolymer produced preferably has a MWD of over 2 to 10 and a $MFR_2$ in the range of 0.01 to 1500 g/10min, preferably 0.05 to 500 g/10 min.

In the second embodiment of the invention, wherein a uni- or bimodal propylene homo- or copolymer is blended and compounded with a polymer comprising vinyl compound units, the blending is carried out as known in the art using said nucleating polymeric agent.

By means of both embodiments, a propylene homopolymer or the homopolymer matrix of a copolymer is produced having high stiffness, an increased overall degree of crystallization and a crystallization temperature measured with DSC of more than 7° C., preferably over 10° C. and in particular 13° C. higher than that of the corresponding non-nucleated polymer. The degree of crystallization for the propylene homopolymer is generally over 48%, often over 50%, and the elasticity modulus is about 2,000 MPa or more. The elasticity modulus of block copolymers containing about. 12 wt-% of a rubbery component is about 1,500 MPa or more.

The amount of the nucleating polymeric agent is, in case of polymerized vinyl compounds, about 0.0001 to 1 wt-%, and in case of polypropylene blends about 0.0001 to 0.5 wt-%, typically below 0.1 wt-% and preferably<0.01 wt-%.

If desired, the polymerization product can be fed into a gas phase reactor in which a rubbery copolymer is provided by a (co)polymerization reaction to produce a modified polymerization product. This polymerization reaction will give the polymerization product, comprising e.g. a propylene-ethylene block copolymer, properties of improved impact strength. The step of providing an elastomer can be perfomed in various ways. Thus, preferably an elastomer is produced by copolymerizing at least propylene and ethylene into an elastomer. The conditions for the copolymerization are within the limits of conventional EPM production conditions such as they are disclosed, e.g., in Encyclopedia of Polymer Science and Engineering, Second Edition, Vol. 6, p.545–558. A rubbery product is formed if the ethylene repeating unit content in the polymer lies within a certain range. Thus, preferably, ethylene and propylene are copolymerized into an elastomer in such a ratio that the amorphous part of the copolymer contains from 10 to 70% by weight of ethylene units. In particular, the ethylene unit content is from 30 to 50% by weight of the amorphous part of the copolymer propylene/ethylene elastomer. In other words, ethylene and propylene are copolymerized into an elastomer in a molar ratio of ethylene-to-propylene of 30/70 to 50/50. Polymers modified by adding the rubbery copolymer in a gas phase reactor are typically called polypropylene block copolymers or heterophasic copolymers.

The elastomer can also be provided by melt blending a ready-made or natural elastomer to the polymer product containing no elastomer made in a postreactor.

The amount of a rubbery component can vary in wide ranges, being preferably about 5 to 30 wt-%, more preferably about 10 to 20 wt-%.

Polymer Compositions

The present polymers and copolymers of propylene can be blended and optionally compounded with adjuvants, such as additives, fillers and reinforcing agents conventionally used in the art and/or with other polymers. Thus, suitable additives include antioxidants, acid scavengers, antistatic agents, flame retardants, light and heat stabilizers, lubricants, nucleating agents, clarifying agents, pigments and other colouring agents including carbon black. Fillers such as talc, mica, calcium carbonate and wollastonite can also be used.

The colouring agent used in the present invention can be any colouring pigment, organic or inorganic. As explained in more detail in our copending patent application, by dominating the nucleating effect, if any, of the pigment, the nucleated propylene homo- or copolymer will provide a controlled and predictable shrinkage irrespective of the pigment. Examples of colouring pigments are white pigments, such as titanium dioxide, yellow/orange pigments such as isoindolinone or azocondensation, red/violet such as quinacridone or diketo pyrrolo pyrol, blue/green pigments such as ultramarine blue or Cu Phtalocyanine blue, and black pigments such as carbon black. Pigments giving a tint (translucent moulded products) can also be considered. The amount of pigments is usually 0.01 to 5% by weight of the polypropylene component.

According to a preferred embodiment, the present propylene polymers are blended and optionally compounded with a propylene polymer manufactured with an unmodified catalyst, or with another polymer, in particular a polyolefin selected from the group of LD-, LLD-, MD- and HD-polyethylenes and polybutylene.

The reinforcing agents suitable for use in the present invention can be selected from chopped or continuous glass fibres, carbon fibres, steel fibres and cellulose fibres.

With reference to the fillers, as described in our copending patent application, the addition of talc in amounts of 0.1 to 10 wt-% will provide particularly interesting advantages. Thus, it increases the stiffness of the propylene polymer composition by up to 5%. Talc in polypropylene compositions gives rise to higher tensile modulus than talc in standard PP copolymer. The Heat Deflection Temperature (HDT) is also increased by the addition of talk, and the HDT value increases more for the present polypropylene compositions nucleated with a vinyl compound than for standard PP. The crystallization temperature of the present compositions is higher than for standard PP containing corresponding amounts of talc and for polypropylene compositions nucleated with a vinyl compound. Although the shrinkage of the present compositions is somewhat higher that that of standard PP containing talc it is still within the tolerance limits and the present invention provides a unique combination of excellent stiffness (up to 1,600 MPa or more), controlled shrinkage and high $T_{cr}$ giving good cyclus potential.

The present blends can be produced by methods known per se, e.g. by mixing the polymer components with the the adjuvants in the desired weight relationship using a batch or a continuous process. As examples of typical batch mixers, the Banbury and the heated roll mill can be mentioned. Continuous mixers are exemplified by the Farrel mixer, the Buss co-kneader, and single- or twin-screw extruders.

Manufacture of Tubes, Pipes and Fittings

As discussed above, the present homopolymer or copolymer compositions can be used for the manufacture of moulded articles, in particular articles processed by moulding and extrusion, in particular by blow moulding, injection moulding, compression moulding and pipe, sheet or film and cable extrusion. Thus, the polymers can be used for the manufacture of automotive parts, appliances, cups, pails, bottles, caps, closures and lids. Considering the appliances, application areas are mainly housings for beverage machines (water kettles, coffee makers etc.), housings for high temperature appliances (irons, toasters, deep fat fryers), level indicators, liquid reservoirs (requiring good clarity), and aesthetic and hygienic housings for food preparation equipment.

A particularly interesting application comprises the manufacture of various tubes and pipes by extrusion and fittings by injection moulding. These embodiments will be discussed in more detail in the following.

Extrusion of pipes can be made with different kinds of extruders for polyolefin polymers, e.g. single or double screw extruders. For solid wall pipes preferably a single screw extruder is used with smooth or a grooved inlet section for force feeding. The screw design relates back to the type of inlet section. With a smooth inlet section a conventional 3 step screw (conveying, compression and metering) with a compression ratio of, e.g., 1:3 and a screw length of, e.g., 25 D can be used. Force feeding screw design have generally a smaller flight depth and lower compression ratio and a longer screw length, e.g. 30 D. The screws can be modified in respect of mixing elements or barrier screws for the same purpose. The polymer melt, melt temperature around 180 to 250° C., preferably about 210 C., is metered from the screw into the die head, where the pipe is formed. The formed pipe is transferred to a sizing unit, where the pipe is solidified and cooled down. The sizing unituses vacuum calibration or pressure calibration for correct dimensions of the pipe. Additional water baths can be added to the extrusion line for solidification and cooling down the formed pipe.

Extrusion of multilayer pipes follows the principle above, but different polymer melt streams are feed to the die-head, e.g. by additional single screw extruders, and a multilayer pipe is formed for sizing and cooling. A similar principle to the multilayer is used for structured wall pipes, where the outer layer is formed to external ribs, e.g. double wall pipes with an outside corrugated layer and an inside smooth layer.

Injection moulding of fittings (connection parts, bends, tees, etc.), valve parts, or other assorted parts of the sewage piping system can be made using a conventional IM machine with an injection part, e.g. extruder melting down the PP polymer and it injects the polymer into the mould(s), one or more moulds with or without insertions of cores, i.e. shaping the fitting, and a mould locking part. The mould is designed for a shrinkage of the PP polymer of about 1.0 to 2.5%, in particular about 1.5%. The melt temperature for injection can be about 200 to about 260° C., in particular about 240° C. The hold-on pressure of the mould can be about 40 to about 60% of the injection pressure, with or without profile during the step-wise pressure reduction. Injection in profile could be used with fittings consisting of different difficult bends or wall thickness variations in the flow channel (fitting part) of the mould. The mould temperature should preferably be in the range of about 40 to about 60° C. An alternative method is extrusion injection, where the mould is filled by extrusion before the injection.

During extrusion the present polymer give excellent output and good pipe surfaces. In particular in comparison to conventional PP, such as the polymer mentioned in comparative example 3, which is similar in MWD of homopolymer phase and rubber phase, an at least 10% higher output can be obtained. A better melt strength is also noticed during extrusion. This feature is highly beneficial for extrusion of PP and it makes, e.g., higher wall thickness possible. The nucleation also provides faster cooling by faster solidification and higher Tc.

For injection moulded fittings faster cycle times and better surface properties are obtained. As above, the solidification is faster and Tc is higher.

Products and Product Properties

Efficiently nucleated propylene polymers (in the following also "stiff PP") manufactured as described above have a number applications including the field of HEVAC. Thus, by using the present polymers thinner pipes and fittings for buried sewage systems, solid wall pipes and fittings, can be made by, e.g., utilizing pipe series S14 instead of S12.5 or S11.2 to reach stiffness>8 kN/m$^2$ or alternatively reach stiffness>6 kN/m$^2$ with pipe series S 16. The S-series and corresponding wall thickness are described in ISO 4065.

Generally speaking, the present invention makes it possible to make thinner pipes within a given dimensioning pipe series and thereby to save material by lower weight/m pipe. The enhanced stiffness is manifested in both radial and axial directions of the pipe. The latter property improves the handling of the pipes and prevents a large-diameter sewage pipe from axial sagging. The radial stiffness (e.g. stiffness class>8 kN/m$^2$) decreases the deformation of the pipe by soil pressure and traffic loads which means that, e.g., the laying depth can be increased and the pipe can be used under heavy trafficked streets. The present pipes, accordingly dimensioned, can also be used in less favourable soil conditions since for a flexible pipe the horizontal soil pressure is the force preventing the pipe from collapsing.

The present polymeric materials can also be employed for indoor sewage pipes and fittings, where the stiffness will give a more rigid product with existing dimensioning. The materials can also be used for structured-wall sewage pipes, where the increased stiffness can be utilized to decrease the amount of material used for a specific stiffness, i.e. lower weight/m pipe. Also the injection moulded fittings can be dimensioned with less material for a specific stiffness.

Stiff PP can also be used for multilayer constructions, e.g. 2–5 layered pipes combining different PP materials, where at least 1 of the layers is stiff PP. It provides high stiffness in combination to good impact properties and can be combined with other layers (such as non-nucleated PP) for functional use. These multilayer pipes include structured wall pipes and smooth multilayer pipes for sewage applications.

Stiff PP can be used in filled PP systems to increase the total stiffness including fillers and non-nucleated PP and to achieve good impact properties by the impact enhancement. Filled polymers can be used as alternatives to non-filled sewage pipes, e.g. in multilayer pipes. The pressure resistance (Slow Crack Growth Properties) is improved compared to that of non-nucleated PP, which leads to better long term prperties. This also opens up the opportunity to use the material for pressure pipes and fittings.

The present stiffPP products can also be used in optical fibre cable buffer tubes. These buffer tubes are commonly made from poly(butylene terephthalate), PBT. WO Application 96/23239 (Alcatel) discloses a buffer tube for optical fibre cables made from a PP-PE copolymer resin having nucleating agents and filler materials dispersed therein. The nucleating agents are conventional nucleating agents, i.e. inorganic materials and salts of mono- or dibasic acids or arylalkyl acids or metal or aluminium salts of aromatic or alicyclic carboxylic acids used in amounts of 0.1 to 1 wt-%. According to the present invention better transmission and mechanical properties can be obtained by using the present polypropylenes which are nucleated with polymerized vinyl compounds. By controlling the crystallinity of polypropylene the quality of PP buffer tubes can be further improved. Polypropylene nucleated with polymerized vinyl compounds can be used for all known designs and types of fibre optic buffer tubes applicable for polypropylene.

An essential difference between the present invention and the above-mentioned known tubes is that the amount of polymerized vinyl compounds stemming from catalyst residues is below 0.1 wt-ppm and typically below 0.01 wt-ppm.

Figure 1A:
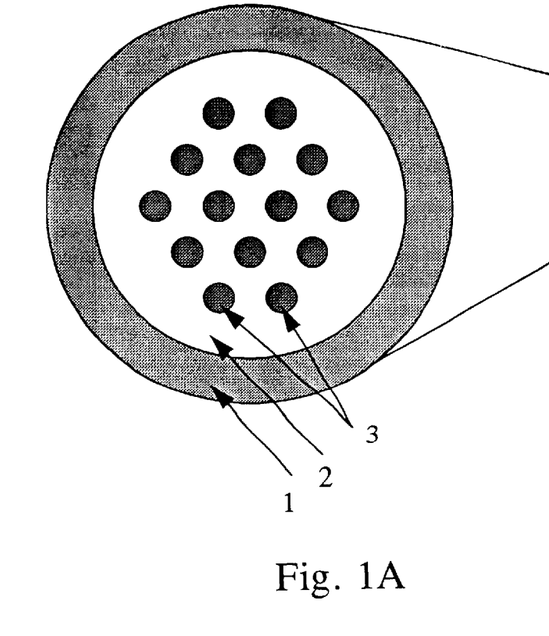
FIGS. 1A shows the cross-section of an optical fibre buffer tube according to the present invention.
Figure 1B:
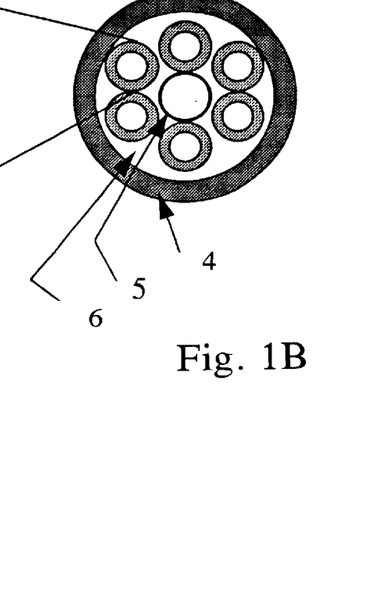
FIG. 1B depicts the cross-section of an optical cable containing a plurality of the present optical fibres.

An example of the structure of fibre optic buffer tubes is disclosed in FIGS. 1A and 1B. In cross-section, a buffer tube according to the present invention comprises an outer skin layer 1 comprising a polypropylene material nucleated according to the invention. The thickness of the outer layer is generally in the range from 0.01 to 10 mm. The core of the tube comprises a number of optical fibres 3 completely surrounded by/immersed in a filling compound 2. The filling compound is, e.g., a hydrocarbon-based gel or polymer of thixotropic character. The buffer tubes can be fitted into an optical cable as depicted in FIG. 1B, or any other known strucre of optical cables based on buffer tubes. In the example depicted in FIG. 1B, the cable comprises a jacket 4, a strength member 5 (e.g. a metal wire), and a flooding compound 6. The buffer tubes 1–3 are fitted around the strength member 5.

Figure 2:
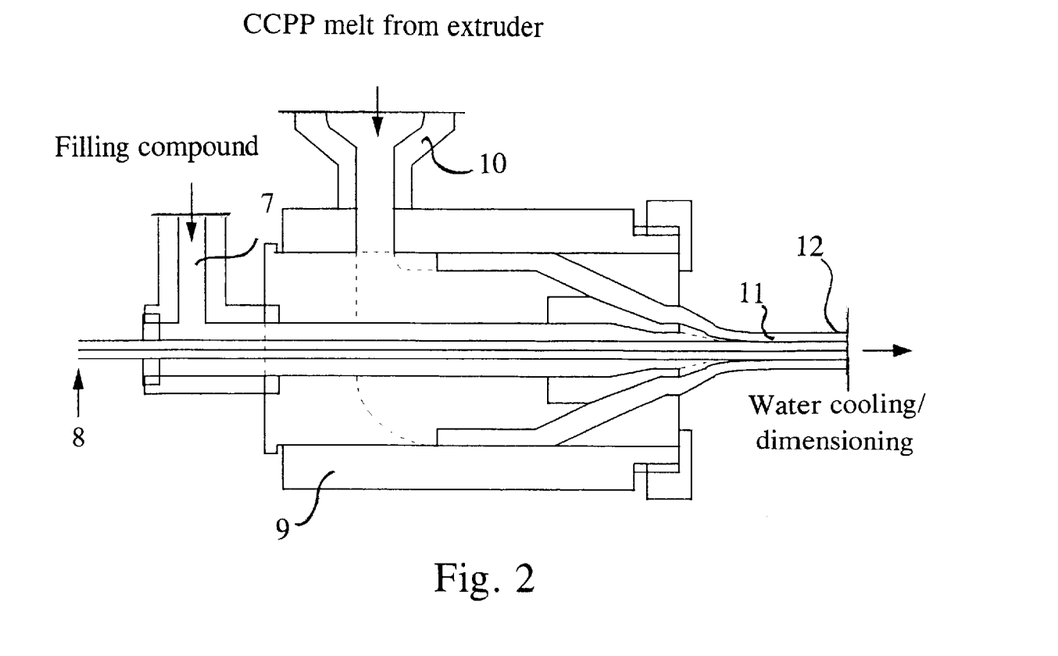
FIG. 2 discloses in a schematical fashion an extrusion process for producing buffer tubes.

The buffer tubes can be produced as depicted in FIG. 2 by a coextrusion process. Thus, the liquid filling compound is pumped 7 under controlled pressure and flow into the centre of an extruder head 9, surrounding completely the optical fibre strands 8 which are fed into the extruder head 9. Nucleated propylene copolymer melt is fed from an extruder through an adapter 10 into the head 9, forming a tube around the filling compound layer 11. The product 12 from the extruder head is conducted to water cooling and dimensioning.

The preferred buffer tubes according to the invention comprise a heterophasic, impact-modified propylene block copolymer in which the propylene polymer has been copolymerized with an ethylene and propylene polymer. Preferably such a block copolymer has a crystallization temperature of over 124° C., preferably over 126° C., a tensile modulus of greater than 1400. MPa, preferably greater than 1500 MPa, and a xylene soluble fraction at 23° C. of not more than 15 wt-%, preferably<13 wt-%.

EXAMPLES

The following non-limiting examples illustrate the invention.

In the present context (throughout the specification), the following test methods were used in characterizing the properties of the polymers:

HDT (heat deflection temperature): ISO 75–2, method B/0,45MPa

Charpy: ISO 179/at room temperature (if no other T mentioned)

Flexural modulus: ISO 178/at room temperature (if no other T mentioned)

Tensile modulus and tensile strength: ISO 527-2

SHI (the shear thinning index) (0/50): is defined as a ratio of the zero shear viscosity h0 to the viscosity G*=50 kPa. SHI is a measure of molecular weight distribution.

XS: Polymer solubles in xylene at 25° C., measured by dissolving the polymer in xylene at 135° C., and allowing the solution to cool to 25° C. and filtering then the insoluble part out.

AM: Amorphous part, measured by separating the above xylene soluble fraction and precipitating the amorphous part with acetone.

Thermal properties:
Melting temperature, $T_m$, crystallisation temperature, $T_{cr}$, and the degree of crystallinity were measured with Mettler TA820 differential scanning calorimetry (DSC) on 3±0.5 mg samples. Both crystallisation and melting curves were obtained during 10° C./min cooling and heating scans between 30° C. and 225° C. Melting and crystallisation temperatures were taken as the peaks of endotherms and exotherms. The degree of crystallinity was calculated by comparison with heat of fusion of a perfectly crystalline polypropylene, ie., 209 J/g.

Example 1

A high yield $MgCl_2$ supported $TiCl_4$ Ziegler-Natta catalyst prepared according to Finnish Patent No. 88047 was dispersed into a mixture of oil and grease (Shell Ondina Oil N 68 and Fuchs Vaseline Grease SW in 2:1 oil-to-grease volume ratio). The titanium content of the catalyst was 2.5 wt-%, and the concentration of the catalyst in the. oil/grease mixture was 15 g cat/dm$^3$. Triethylaluminium (TEAL) was added to the catalyst dispersion in a TEAL to titanium mole ratio of 1.5. After that vinylcyclohexane (VCH) was added to the reaction mixture, and the VCH to catalyst weight ratio was 1:1. The reaction mixture was mixed at a temperature of 55° C. until the concentration of unreacted VCH in the reaction mixture was 1000 ppm by weight.

Example 2

Propylene homopolymers were produced in a pilot plant having a, prepolymerization reactor, a loop reactor and a fluid bed gas-phase reactor connected in series. The catalyst used in the polymerizations was a VCH-modified Ziegler Natta catalyst prepared similarly to Example 1, the cocatalyst was triethylaluminum, TEA, and as an external electron donor dicyclopentyl dimethoxy silane, D, was used.

The VCH-modified catalyst, TEA and the donor were fed to the prepolymerization reactor for prepolymerization with propylene. After the prepolymerization step the catalyst, TEA and the donor were transferred to the loop reactor where the polymerization in liquid propylene took place. From the loop reactor the polymer was transferred to the gas phase reactor without flashing the non-reacted monomer and hydrogen between the reactors. Polymerization was continued in the gas phase reactor to which additional propylene and hydrogen were fed.

The polymerization temperature in the loop and in the gas phase reactors was 70° C. The hydrogen feed was adjusted such that the polymer in the loop reactor had an $MFR_2$ of 0.04 g/10 min and in the gas phase reactor an $MFR_2$ amounting to 3.4 g/10 min. The production rate ratio between loop and the gas phase reactor was 45/55.

The properties of the polymers made as described above are summarized in Table 1.

Example 3

The polymerization procedure was as described in Example 2.

The polymerization temperature in the loop and in the gas phase reactors was 80° C. The hydrogen feed was adjusted such that the polymer in the loop reactor had an $MFR_2$ of 3.6 g/10 min. and in the gas phase reactor an $MFR_2$ of 7.7 g/10 min. The production rate ratio between loop and the gas phase reactor was 60/40.

The properties of the polymers made as described above are summarized in Table 1.

Example 4

The polymerization procedure was as described in Example 2.

The polymerization temperature in the loop and in the gas phase reactor was 80° C. The hydrogen feed was adjusted such that the polymer in the loop reactor had an $MFR_2$ of 0.07 g/10 min. and in the gas phase reactor an $MFR_2$ of 4.3 g/10 min. The production rate ratio between loop and the gas phase reactor was 28/72.

The properties of the polymers made as described above are summarized in Table 1.

Example 5

The polymerization procedure was as described in Example 2.

The polymerization temperature in the loop and in the gas phase reactor was 90° C. The hydrogen feed was adjusted such that the polymer in the loop reactor had an $MFR_2$ of 4.1 g/10 min. and in the gas phase reactor an $MFR_2$ of 7.2 g/10 min. The production rate ratio between loop and the gas phase reactor was 50/50.

The properties of the polymers made as described above are summarized in Table 1.

Example 6

A high yield $MgCl_2$ supported $TiCl_4$ Ziegler-Natta catalyst prepared according to Finnish Patent No. 88047 was dispersed into a mixture of oil and grease (Shell Ondina Oil N 68 and Fuchs Vaseline Grease SW at a 3.2:1 oil/grease volume ratio). The concentration of the catalyst was about 181 g cat/l of oil-grease-catalyst mixture. Triethylaluminium (TEAL) was added to the catalyst dispersion in a TEAL to catalyst weight ratio of (Al/Ti mole ratio 1.5). After that vinylcyclohexane (VCH) was added to the reaction mixture, and the VCH to catalyst weight ratio was 0.85:1. The reaction mixture was mixed at a temperature of 55° C. until the concentration of unreacted VCH in the reaction mixture was<1000 ppm-w.

Example 7 (comparative)

A non-transesterified high yield $MgCl_2$ supported $TiCl_4$ Ziegler-Natta catalyst was dispersed into a mixture of oil and grease (Shell Ondina Oil N 68 and Fuchs Vaseline Grease SW in 2:1 Oil/grease volume ratio). The concentration of catalyst was about 175 g cat/l of oil-grease-catalyst mixture.

Example 8 (comparative)

The catalyst in the oil-crease mixture (catalyst mud) obtained from Example 7, TEAL, cyclohexylmethyldimethoxysilane (donor C) and propylene was continuously fed to a process consisting of two loop reactors and a fluid bed gas phase reactor.

The TEAL and donor C in a 4 w/w ratio was contacted before mixing with the catalyst mud. After that the mixture was flushed with propylene, containing the desired amount of hydrogen as molecular weight regulating agent, to a continuous stirred prepolymerisation reactor.

After the prepolymerisation, the reaction mixture. together with additional propylene and hydrogen was fed to a continuous loop reactor process (including two loop reactors) operating at 68° C. The amount of hydrogen (molecular weight regulater agent) fed into the loop reactors was controlled in a way that higher molecular weight fraction was produced in the first loop reactor and the lower molecular weight fraction respectively in the second loop reactor. The reactor split for the loop reactors was 51/49%.

The obtained PP homopolymer-propylene slurry containing the catalyst was continuously recovered from the second loop reactor to a flashing unit where the liquid propylene was vaporised and the remaining solid polymer particles, containing the active modified catalyst, was further fed to a continuous fluidised bed gas phase rector where a propylene ethylene elastomer for impact modification was produced. The gas phase reactor operated at a temperature of 73.5° C. The desired amount of propylene and ethylene was continuously fed to the reactor, and the molecular weight of the copolymer produced was controlled with desired amount of hydrogen. The final polymer was continuously recovered from the gas phase reactor. After purging the unreacted

TABLE 1

Properties of the polymers

| | | Example 2 | Example 3 | Example 4 | Example 5 |
|---|---|---|---|---|---|
| $MFR_2$ | g/10 min | 3.4 | 7.7 | 4.3 | 7.2 |
| XS | % | 1.5 | 1.5 | 1.5 | 1.3 |
| $T_m$ | ° C. | 166.1 | 166.0 | 165.3 | 166.2 |
| $T_{cr}$ | ° C. | 126.1 | 127.3 | 127.7 | 127.5 |
| Crystallinity | % | 53.3 | 52.9 | 54.8 | 55.1 |
| Zero viscosity | Pas | 18,000 | 6,570 | 29,180 | 5,950 |
| SHI (0/50) | | 19 | 7.8 | 38 | 7.3 |
| Tensile strength | MPa | 39.4 | 39.2 | 40.2 | 39.4 |
| Tensile modulus | MPa | 2,070 | 2,030 | 2,150 | 2,000 |
| Flexural modulus | MPa | 1950 | 1930 | 2070 | 1930 |
| Charpy, notched | $kJ/m^2$ | 4.4 | 4.2 | 3.5 | 4.1 |
| HDT (0.45 MPa) | ° C. | 110 | 110 | 115 | 109 | monomers, the required stabilisers and other additives were added and the polymer powder was pelletised with an extruder.

The properties of the polymer are indicated in Tables 2 to 5 under the heading "reference".

Example 9

The modified catalyst in the oil-crease mixture (catalyst mud) obtained from Example 6, TEAL, dicyclopentyldimethoxysilane and propylene was continuously fed to process consisting from two loop rectors and a fluid bed gas phase rector.

The TEAL and dicyclopentyldimethoxysilane in a 4 w/wratio Was contacted before mixing with the catalyst mud. After that the mixture was flushed with propylene, containing the desired amount of hydrogen as molecular weight regulating agent, to a continuous stirred prepolymerisation reactor.

After prepolymerisation, the reaction mixture together with additional propylene and hydrogen was fed to a continuous loop reactor process (including two loop reactors) operating at a temperature of 68° C. The amount of hydrogen (molecular weight regulating agent) fed into the loop reactors was controlled in such a way that a higher molecular weight fraction was produced in the first loop reactor and a lower molecular weight fraction in the second loop reactor. The reactor split for the loop reactors was 52/48%.

The resulted PP homopolymer-propylene slurry containing the catalyst was continuously recovered from the second loop reactor to a flashing unit where the liquid propylene was vaporised and the remaining solid polymer particles, containing the active modified catalyst, was further fed to a continuous fluidised bed gas phase rector where a propylene ethylene elastomer for impact modification was produced. The gas phase reactor operated at a temperature of 71.5° C. A desired mount of propylene and ethylene was continuously fed to the reactor, and the molecular weight of the copolymer produced was adjusted using a selected amount of hydrogen. The final polymer was continuously recovered from the gas phase reactor. After purging the unreacted monomers, the required stabilisers and other additives were added and the polymer powder was pelletised with an extruder.

The properties of the polymer are summarized in Table 2.

Example 10

The modified catalyst in the oil grease mixture (catalyst mud) obtained from Example 6, TEAL, dicyclopentyldimethoxysilane and propylene was continuously fed to process consisting from two loop rectors and a fluid bed gas phase rector.

The TEAL and dicyclopentyldimethoxysilane in a 4 w/w ratio was contacted before mixing with the catalyst mud. After that the mixture was flushed with propylene, containing the desired amount of hydrogen as molecular weight regulating agent, to a continuous stirred prepolymerisation reactor.

After the prepolymerisation, the reaction mixture together with additional propylene and hydrogen was fed to a continuous loop reactor process (including two loop reactors) operating at a temperature of 68° C. The amount of hydrogen (molecular weight regulating agent) fed into the loop reactors was controlled in such a way that a higher molecular weight fraction was produced in the first loop reactor and a lower molecular weight fraction in the second loop reactor. The reactor split for the loop reactors was 52/48%.

The resulted PP homopolymer-propylene slurry containing the catalyst was continuously recovered from the loop reactor to a flashing unit where the liquid propylene was vaporised and the remaining solid polymer particles, containing the active modified catalyst, was further fed to a continuous fluidised bed gas phase rector where a propylene ethylene elastomer for impact modification was produced. The gas phase reactor operated at a temperature of 70° C. The desired amount of propylene and ethylene was continuously fed to the reactor, and the molecular weight of the copolymer produced was adjusted using selected amount of hydrogen. The final polymer was continuously recovered from the gas phase reactor. After purging the unreacted monomers, the required stabilisers and other additives were added and the polymer powder was pelletised with an extruder.

The properties of the polymer are summarized in Table 2.

TABLE 2

Polymer compositions and properties

| Sample | | Reference | Example 9 | Example 10 |
|---|---|---|---|---|
| MFR$_2$ | g/10 min | 0.22 | 0.23 | 0.22 |
| Total ethylene | wt-% | 8.6 | 6.1 | 5.5 |
| Blockiness | % | 61.3 | 57.4 | 57.2 |
| XS | | 12.6 | 11.5 | |
| AM | wt-% | 12.2 | 11.6 | 10.8 |
| C2 of AM | wt-% | 37.1 | 37.8 | 29.8 |
| IV/AM | | 3.4 | 3.1 | 3.3 |
| T$_{cr}$ of PP | ° C. | 115.9 | 126.9 | 126.8 |
| T$_m$ of PP | ° C. | 164.5 | 165.9 | 165 |
| dH of PP | J/g | 74.2 | 89.4 | 92.1 |

Example 11

Using the polymeric materials of Examples 8, 9 and 10 injection moulded articles were manufactured. An IM machine KM90/340B, 40 mm screw, max. clamping force 90 ton was used. The machine settings were; barrel temperature profile 240 to 257° C., melt temperature about 258° C., injection pressure at cavity about 280 bar, hold-on pressure 25 about 70 bar, and mould temperature 58 to 62° C. The injection time was 4 s, hold-on time 40 to 45 s, and cooling time 10 to 15 s.

The physical properties are summarized in Table 3.

TABLE 3

Physical properties of injection moulded articles

| Property | | | Reference | Example 9 | Example 10 |
|---|---|---|---|---|---|
| Tensile Modulus | ISO 527 | MPa | 1210 | 1460 | 1520 |
| Stress at yield | ISO 527 | MPa | 28.3 | 29.9 | 31.1 |
| Flexural Modulus | ISO 178 | MPa | 1380 | 1540 | 1620 |
| Charpy notched | ISO 179 | | | | |
| (−20° C.) | | kJ/m$^2$ | 4.4 | 4.4 | 4.3 |
| (+23° C.) | | kJ/m$^2$ | 35.1 | 53.7 | 43.9 |

As apparent from Table 3, the injection moulded articles according to the present invention have a tensile modulus and a flexural modulus which are over 10 to 20% higher than those of the reference, while the other important physical properties remain unchanged or are improved.

Example 12

Physical Properties of Compression Moulded Plaques

Compression moulded plaques were made from the materials described in Examples 8 to 10 with a Fontijne Press, 4 mm thickness, heating-up time 5 min, pre-heating at 210° C. for 5 min (hold), and moulding for 5 min at 210° C. The cooling rate was 15° C./min. Test bars were milled from the plaque. The physical properties of the plaques were determined. The results are indicated in Table 3.

TABLE 4

Physical properties of compression moulded plaques

| Property | | | Reference | Example 9 | Example 10 |
|---|---|---|---|---|---|
| Tensile Modulus | ISO 527 | MPa | 1130 | 1460 | 1560 |
| Stress at yield | ISO 527 | MPa | 24.5 | 24.3 | 27 |
| Charpy notched | ISO 179 | | | | |
| (0° C.) | | kJ/m$^2$ | 9.5 | 32.2 | 12.1 |
| (+23° C.) | | kJ/m$^2$ | 63.8 | 70 | 67 |

As apparent, the physical properties of the plaques according to the invention are superior to those of the reference. In particular it should be noted that the tensile strength and the impact strength are clearly improved.

Example 13

The materials of Examples 8 to 10 were utilized for the manufacture of pipes by conventional pipe extrusion. For the determination pressure resistance, OD 32 mm pipes, SDR 11 were produced with a Battenfeld 45 mm single screw extruder with grooved feed section. The temperature setting were: Inlet 57 to 60° C., temperature profile on cylinder 185 to 200° C., and die head including tool at 205 to 210° C. The melt temperature was 232 to 233° C. The screw speed was 45 rpm resulting in an out put of about 30 kg/h.

The test results of pressure resistance testing appear from Table 5.

TABLE 5

Pressure resistance of pipes

| Test method EN 921 | | Reference | Example 9 | Example 10 |
|---|---|---|---|---|
| Temperature ° C. | Stress MPa | | Failure time (h) | |
| 20 | 16 | 5.8 | 21 | 116 |
| 80 | 4.2 | 365 | 355 | 1063 |

The data of given in the table clearly indicate the applicability of the present materials for pressure pipes.

For the determination of ring stiffness, OD 110 mm pipes were produced with a 125 mm single screw extruder, temperature profile 190 to.230° C., inlet zone 30° C., melt temperature about 226° C., screw speed 120 rpm, and an output of 195 to 210 kg/h.

Pipe ring stiffness, according to ISO 9969, and a calculated value normalised value for ring stiffness at a thickness of 4.6 mm and dimensioning series S14 (definition in ISO 4065:1996), were determined and the results are indicated in Table 6:

TABLE 6

Pipe Ring Stiffness

| Property | Method | Unit | Reference | Ex. 9 | Ex. 10 |
|---|---|---|---|---|---|
| Ring stiffness Constant Speed | ISO 9969 | kN/m$^2$ | 5.3 | 5.9 | 6.6 |
| Wall thickness | | mm | 4.17 | 4.15 | 4.1 |
| Outside diameter | | mm | 110.5 | 109.9 | 110.1 |
| Normalised RCS, 4.6 mm | | | 7.11 | 8.03 | 9.32 |

Normalised Ring Stiffness Constant Speed is:

$$\text{Normalised RCS} = \text{RCS measured} \times (S_n)^3/(S_m)^3$$

$S_n$=4.6 mm
$S_m$=measured wall thickness

The table shows that the ring stiffness can be improved by 10 to 30% by means of the invention.

Example 14

The modified catalyst in the oil grease mixture (catalyst mud) obtained from Example 6, TEAL, dicyclopentyldimethoxysilane and propylene was continuously fed to process consisting from two loop rectors and a fluid bed gas phase rector.

The TEAL and dicyclopentyldimethoxysilane in a 4 w/w ratio was contacted before mixing with the catalyst mud. After that the mixture was flushed with propylene, containing the desired amount of hydrogen as molecular weight regulating agent, to a continuous stirred prepolymerisation reactor.

After the prepolymerisation, the reaction mixture together with additional propylene and hydrogen was fed to a continuous loop reactor process operating at a temperature of 68° C., The molecular weight of the polymer (i.e. MFR$_2$) was controlled with the amount of hydrogen (molecular weight regulating agent) fed into the loop reactors.

The resulted PP homopolymer-propylene slurry containing the catalyst was continuously recovered from the loop reactor to a flashing unit where the liquid propylene was vaporised and the remaining solid polymer particles, containing the active modified catalyst, was further fed to a continuous fluidised bed gas phase rector where a propylene ethylene elastomer for impact modification was produced. The gas phase reactor operated at a temperature of 70° C. The desired amount of propylene and ethylene was continuously fed to the reactor, and the molecular weight of the copolymer produced was adjusted using selected amount of hydrogen. The final polymer was continuously recovered from the gas phase reactor. After purging the unreacted monomers, the required stabilisers and other additives were added and the polymer powder was pelletised with an extruder.

The properties of the polymer are summarized in Table 7:

TABLE 7

Polymer composition and properties

| Sample | Unit | Properties* |
|---|---|---|
| MFR2 | g/10 min | 3.5 |
| Density | kg/m$^3$ | 905 |

TABLE 7-continued

Polymer composition and properties

| Sample | Unit | Properties* |
| --- | --- | --- |
| Total ethylene | wt.-% | 6.0 |
| XS | wt.-% | 12.0 |
| AM | wt.-% | 11.0 |
| C2 of AM | wt.-% | 38.0 |
| IV/AM | wt.-% | 2.8 |
| Tensile stress, yield | dl/g | 25 |
| Elongation, yield | MPa | 6.0 |
| Charpy impact, notched (23°) | kJ/m² | 10** |
| Rockwell R hardness | — | 87 |

Example 15

The material of Table 7 was extruded on a Nokia-Maillefer extruder for wire and cable applications having an appropriate w&c application crosshead, and barrier screw with dimension 60 mm×24D. The extrusion processing/tooling was following the so called "tubing" principle (cf. FIGS. 1A, 1B).

The buffer tubes were produced in dimensions from 3.0 to 5.0 mm outer diametre with fibre counts from 12 to 18. The space between fibres and tube wall was filled with a synthetic, PP-compatible filling compound to prevent water penetration into the tube (cf. FIG. 2)

Extruder temperature settings:
Cylinder: 160–230° C., head and tooling: 220–230° C.
screw speed: 30–80 rpm, output rate: 15–40 kgs/h

What is claimed is:

1. A nucleated propylene polymer containing 0.0001 to 1 wt-% of a polymerized vinyl compound having the formula wherein $R_1$ and $R_2$ together form a 5 or 6 membered saturated or unsaturated or aromatic ring,
comprising a propylene homopolymer or a homopolymer matrix of a block copolymer having a xylene soluble fraction at 23° C. of less than 2.5%, a crystallization temperature of over 126° C., and a degree of crystallization of more than 50%, wherein the tensile modulus of the homopolymer or homopolymer matrix is greater than 2,000 MPa, said polymer being produced by polymerization of propylene optionally with comonomers in the presence of a transesterified Ziegler-Natta catalyst system modified with a polymerized vinyl compound and comprising a strongly coordinating external donor, and said polymer containing less than 0.01 wt-ppm of any unpolymerized vinyl compound.

2. The polymer according to claim 1, comprising a block copolymer containing a homopropylene polymer matrix and further containing a rubbery copolymer, said block copolymer having a tensile modulus of greater than 1400 MPa, with a maximum rubbery content of 15 wt-%.

3. The polymer according to claims 1 or 2, wherein the polymerized vinyl compound is selected from the group consisting of vinyl cycloalkane, styrene, p-methyl-styrene and mixtures thereof.

4. A process for preparing a nucleated propylene homopolymer or a homopolymer matrix of a block copolymer having a xylene soluble fraction at 23° C. of less than 2.5%, a crystallization temperature of over 126° C., and a degree of crystallization of more than 50 %, wherein the tensile modulus of the homopolymer or homopolymer matrix is greater than 2,000 MPa, comprising the steps of A. modifying a catalyst system primarily transesterified with a phthalic acid ester—a lower alcohol pair, said catalyst system comprising a catalyst component, a cocatalyst component, and a strongly coordinating external donor, the procatalyst component of the catalyst system containing magnesium, titanium, halogen and an electron donor, by polymerizing a vinyl compound of the formula wherein $R_1$ and $R_2$ together form a 5 or 6 membered saturated or unsaturated or aromatic ring or they stand independently for a lower alkyl comprising 1 to 4 carbon atoms in the presence thereof;
and using the modified catalyst composition for polymerization of propylene optionally in the presence of comonomers to provide a nucleated propylene polymer containing 0.0001 to 1 wt-% of said polymerized vinyl compound; or B polymerizing propylene optionally with comonomers in the presence of a catalyst system primarily transesterified with a phthalic acid ester—a lower alcohol pair to provide said propylene polymer, said catalyst system comprising a catalyst component, a cocatalyst component, and a strongly coordinating external donor, the procatalyst component of the catalyst system containing magnesium, titanium, halogen and an electron donor; and
blending it with a nucleated polymer of step A.

5. The process according to claim 4, wherein the polymerized vinyl compound is selected from the group consisting of vinyl cycloalkane, styrene, p-methyl-styrene and mixtures thereof.

6. The process according to claim 5, wherein the catalyst is modified by carrying out the modification in a medium which does not essentially dissolve the polymerized vinyl compound and by continuing the polymenzation of the vinyl-compound until the concentration of unreacted vinyl compounds is less than about 0.5 wt-%, said modification being carried out essentially before any prepolymerization step of the catalyst with an olefinic monomer.

7. The process according to claim 6, wherein the catalyst modification is carried out by
introducing a catalyst: into the reaction medium;
adding a cocatalyst;
feeding a vinyl compound to the agitated reaction medium at a weight ratio of 0.1 to 2 vinyl compound/catalyst;
subjecting the vinyl compound to a polymerization reaction in the presence of said catalyst at a temperature of 35 to 65° C.; and
continuing the polymerization reaction until a maximum concentration of the unreacted vinyl compound of less than 2000 ppm by weight, is obtained.

8. The process according to claim 6 or claim 7, wherein the reaction medium is selected from the group consisting of a medium selected from the group of isobutane, propane, pentane, hexane or a viscous substance, which is inert to the reactants.

9. The process according to claim 5, wherein propylene is polymerized in the presence of a catalyst system transesterified with a phthalic acid ester—a lower alcohol pair at a transesterification temperature in the range of 110 to 150° C.

10. The process according to claim 7, wherein propylene is polymerized in the presence of a catalyst system comprising a procatalyst component, a cocatalyst component, an external donor, the procatalyst component of the catalyst system containing magnesium, titanium, halogen and an internal electron donor, said external donor having the general formula of $$R_nR'_mSi(R''O)_{4-n-m}$$

wherein R' and R can be the same or different and represent branched or cyclic aliphatic, or aromatic groups, R" is methyl or ethyl, and n and m are 0 or 1 and n+m is 1 or 2.

11. The process according to claim 10, wherein the external donor is selected from the group consisting of dicyclopentyldimethoxy silane, di-tert-butyldimethoxy silane, diisopropyldimethoxy silane and diisobutyldimethoxy silane.

12. The process according to claim 4, wherein propylene is polymerized at a temperature in excess of 80° C.

13. The process according to claim 12, wherein the polymerization at a temperature in excess of 80° C. is carried out in at least one/slurry or gas phase reactor.

14. The process according to claim 4, wherein propylene is polymerized by
subjecting propylene and optionally other olefins to polymerization in a plurality of polymerization reactors connected in series and
employing different amounts of hydrogen as a molar mass modifier in at least two of the reactors, so as to provide a high molar mass polymerization product and a low or medium molar mass polymerization product.

15. The process according to claim 14, wherein the molar mass distribution, MWD, of the propylene homo- or copolymer is greater than 4.

16. The process according to claim 14 or 15, wherein propylene is polymerized in a reactor cascade comprising at least one loop reactor and at least one gas phase reactor, the loop reactor being operated at a polymerization temperature of 80 to 110° C.

17. The process to claim 14, wherein the propylene homopolymer produced is fed into a further reactor in which the polymerization product is combined with an elastomer to produce a modified polymerization product.

18. The process according to claim 17, wherein the modified polymerization product exhibits properties of improved impact strength.

19. The process according to claim 17 or 18, wherein the elastomer is produced by copolymerizing propylene and ethylene into an elastomer wherein the amorphous part of the propylene/ethylene copolymer contains from 10 to 70% by weight of ethylene units.

20. The process according to claim 4, wherein a propylene block copolymer is prepared having a crystallization temperature of over 124° C., a tensile modulus of greater than 1400 MPa and a xylene soluble fraction at 23° C. of not more than 15 wt-%.

21. The process according to claim 4, wherein the propylene polymer is blended and optionally compounded with adjuvants selected from the group consisting of additives, fillers and reinforcing agents.

22. The process according to claim 21, wherein the additives are selected from the group consisting of antioxidants, acid scavengers, antistatic agents, flame retardants, light and heat stabilizers, lubricants, nucleating agents, clarifying agents, pigments and carbon black.

23. The process according to claim 21 or 22, wherein the fillers are selected from the group consisting of mica, calcium carbonate, talc and wollastonite.

24. The process according to claim 21, wherein the polymer is blended with another polymer.

25. The process according to claim 21, wherein the reinforcing agent is selected from the group consisting of chopped or continuous glass fibres, carbon fibres, steel fibres and cellulose fibres.

26. Polymer articles produced by a process according to claim 4, further comprising a step of moulding or extruding.

27. The polymer articles according to claim 26, wherein the moulding or extruding step is injection moulding, compression moulding, thermoforming, blow moulding or foaming.

28. The polymer articles according to claim 26 or 27, wherein the polymer articles are sheets, films, cups, pails, bottles, automotive parts, appliances, caps, closures or lids.

29. Polymer pipes or fittings, comprising a nucleated propylene polymer according to claim 1.

30. Pipes or fittings according to claim 29, wherein the polymerized vinyl compound is selected from the group consisting of vinyl cycloalkane, styrene, p-methyl-styrene and mixtures thereof.

31. Pipes or fittings according to claim 29 or claim 30, wherein the nucleated propylene polymer exhibits a Melt Flow Rate (MFR$_2$, ISO 1133, 230° C., 2.16 kg) of 0.05 to 5 g/10 min, a $T_{cr}$ of over 7° C. higher than the $T_{cr}$ of the corresponding non-nucleated polymer, a crystallinity of over 48%, and a MWD>4.

32. Pipes or fittings according to claim 31, wherein the nucleated propylene homopolymers and the homopolymer matrix of a heterophasic copolymers exhibit a xylene soluble fraction at 23° C. of less than 2% and a tensile modulus greater than 2000 MPa.

33. Pipes or fittings according to claim 29, comprising a heterophasic propylene copolymer having a crystallization temperature of over 124° C., a tensile modulus of greater than 1400 MPa, a xylene soluble fraction at 23° C. of not more than 15 wt-%, and an impact strength at 0° C. greater than 7 kJ/m$^2$, and at −20° C. greater than 3 kJ/M$^2$.

34. Pipes or fittings according to claim 29, comprising multilayered wall structures, wherein at least one of the walls comprises a non-nucleated propylene polymer.

35. Pipes or fittings according to claim 34, wherein the walls comprise 2 to 5 layers.

36. Pipes or fittings according to claim 29, suitable for non-pressure sewage or pressure applications.

37. Buffer tube for optical fibre cables, comprising a nucleated propylene polymer according to claim 1.

38. The buffer tube according to claim 37, wherein the propylene polymer is copolymerized with an ethylene and propylene polymer to form an heterophasic impact-modified copolymer.

39. The buffer tube according to claim 37 or claim 38, comprising a heterophasic propylene block copolymer having a crystallization temperature of over 124° C., a tensile modulus of greater than 1400 MPa, and a xylene soluble fraction at 23° C. of not more than 15 wt-%.

40. The polymer according to claim 3, wherein the vinyl cycloalkane is selected from the group consisting of vinyl cyclohexane, vinyl cyclopentane, vinyl-2-methyl cyclohexane and vinyl norbornane.

41. The process according to claim 5, wherein the vinyl mscycloalkane is selected from the group consisting of vinyl cyclohexane, vinyl cyclopentane, vinyl-2-methyl cyclohexane and vinyl norbornane.

42. The process according to claim 7, wherein the step of feeding a vinyl compound to the agitated reaction medium is performed at a eight ratio of 01 to 1.5 vinyl compound/catalyst, and the polymerization reaction is continued until a maximum concentration of the unreacted vinyl compound is less than 1000 PPM by weight.

43. The process according to claim 15, wherein the molar mass distribution, MWD of the propylene homo- or copolymer is greater than 6.

44. The process according to claim 19, wherein the amorphous part of the propylene/ethylene copolymer contains from 30 to 50% by weight of ethylene units.

45. The process according to claim 20, wherein the propylene block copolymer is prepared having a crystallization temperature of 126° C. or higher, a tensile modulus of greater than 1500 MPa and a xylene soluble fraction at 23° C. of ≦13 wt-%.

46. The process according to claim 24, wherein said another polymer is a polyolefin selected from the group consisting of LD-, LLD-, MD- and HD-polyethylene and polybutylene.

47. Pipes or fittings according to claim 30, wherein the vinyl cycloalkane is selected from the group consisting of vinyl cyclohexane, vinyl cyclopentane, vinyl-2-methyl cyclohexane and vinyl norbornane.

48. Pipes or fittings according to claim 31, wherein the nucleated propylene polymer has an MWD of >10.

49. Pipes or fittings according to claim 33, wherein the heterophasic propylene copolymer has a crystallization temperature of over 12600, a tensile modulus of greater than 1500 MPa, a xylene soluble fraction at 23° C. of ≦13 wt-%, an impact strength at 0° C. greater than 10 kJ/m², and at −20° C. greater than 4 kJ/m².

50. The buffer tube according to claim 39, wherein the heterophasic propylene block copolymer has a crystallization temperature of over 126° C., a tensile modulus of greater than 1500 MPa, and a xylene soluble fraction at 23° C. of≦13 wt-%.

51. A nucleated propylene polymer containing 0.0001 to 1 wt-% of a polymerized vinyl compound having the formula wherein $R_1$ and $R_2$ together form a 5 or 6 membered saturated or unsaturated or aromatic ring, comprising a propylene homopolymer or a homopolymer matrix of a block copolymer having a xylene soluble fraction at 23° C. of less than 2.5%, a crystallization temperature of over 126° C., and a degree of crystallization of more than 50%, wherein the tensile modulus of, the homopolymer or homopolymer matrix is greater than 2,000 MPa, said polymer being produced by polymerization of propylene optionally with comonomers in the presence of a transesterified Ziegler-Natta catalyst system modified with a polymerized vinyl compound and comprising a strongly coordinating external donor, and said polymer containing less than 0.01 wt-ppm of any unpolymerized vinyl compound, wherein the catalyst is modified
by carrying out the modification in a medium which does not essentially dissolve the polymerized vinyl compound and
by continuing the polymerization of the vinyl compound until the concentration of unreacted vinyl compounds is less than about 0.5 wt-%, said modification being carried out essentially before any prepolymerization step of the catalyst with an olefinic monomer, wherein the catalyst is transesterified with a phthalic acid ester—a lower alcohol pair at a transesterification temperature in the range of 110 to 150° C., and wherein said external donor has the general formula of $$R_nR'_mSi(R"O)_{4-n-m}$$

wherein R' and R can be the same or different and represent branched or cyclic aliphatic, or aromatic groups, R" is methyl or ethyl, and n and m are 0 or 1 and n+m is 1 or 2.

* * * * *